ABSTRACT OF THE DISCLOSURE

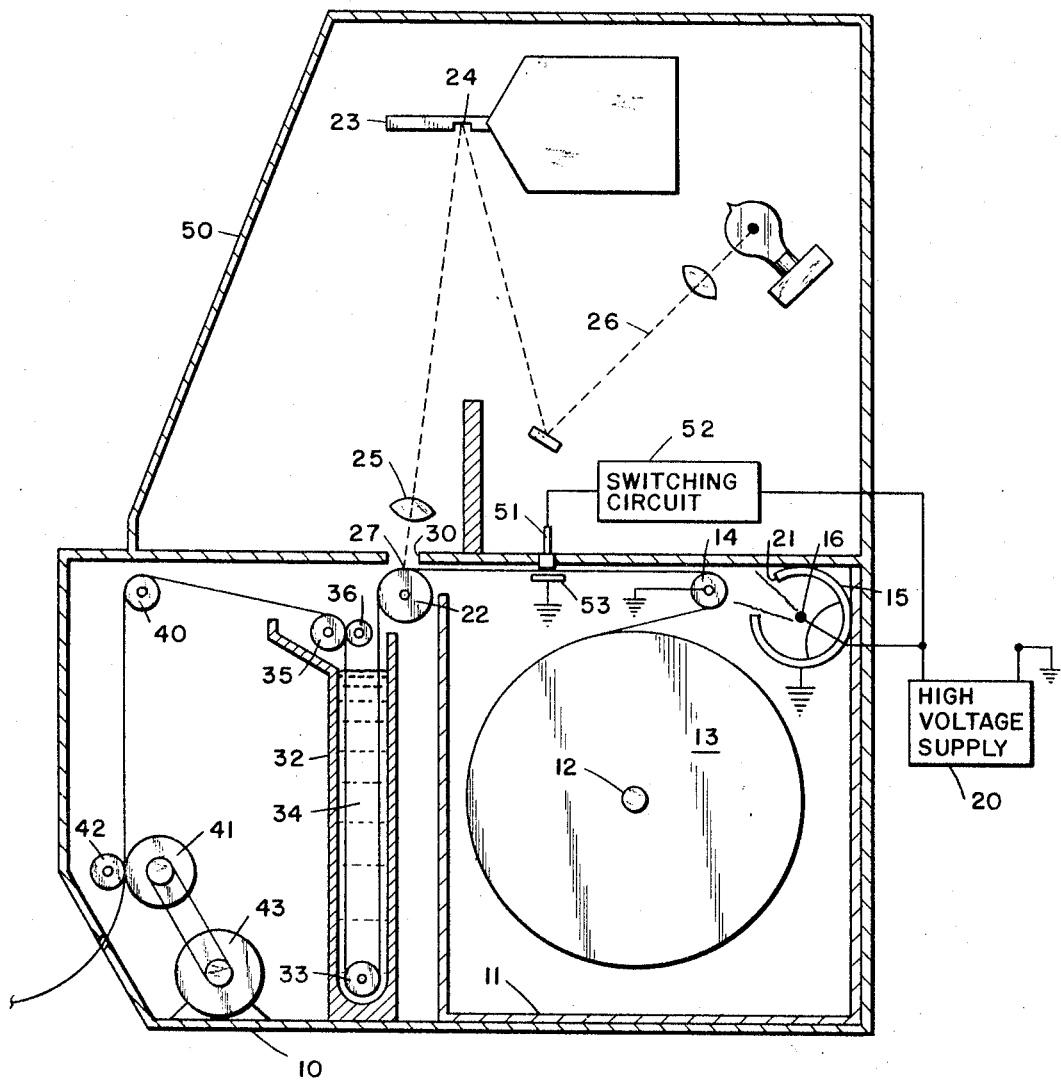
INVENTORS:
ROBERT R. LUKE
MARSHALL M. ROBINSON
KENNETH THOMSON
THEIR ATTORNEY 3,445,856
ELECTROSTATIC MONITORING CAMERA
Robert R. Luke, Houston, Marshall M. Robinson, Sugar Lane, and Kenneth Thomson, Pasadena, Tex., assignors to Shell Oil Company, New York, N.Y., a corporation of Delaware
Filed June 15, 1967, Ser. No. 646,313
Int. Cl. G01d 9/00
U.S. Cl. 346—1                                    2 Claims

A process for continuously monitoring a seismic signal using a photoconductive paper. The paper is fed from a roll past a mirror galvonmeter where the seismic signal is written on the paper and then to a liquid developer bath containing pigmented particles. As the paper leaves the developer bath it passes through a pair of squeeze rollers that remove excess liquid and leave pigmented particles on the paper.

Background of the invention

One method of geophysical prospecting for petroleum deposits consists of obtaining records of the reflections of sound waves generated at the surface and reflected from interfaces between various subsurface earth formations. These records are usually referred to as seismic records and considerable effort is expended both to obtain the original records and to process them so that an accurate assessment can be made of the area surveyed. Normally when the record is obtained a charge of dynamite or other sound source is initiated at the surface. The resulting pressure waves travel through the earth and are reflected from various interfaces. The reflected waves travel to the surface where they are detected by geophones that are spaced in a predetermined pattern with respect to the location of the original explosion. The geophones convert the reflected waves to related electrical signals that are then recorded. At the present time seismic signals are recorded either in the form of frequency modulated signals or sampled and recorded in a digital form on magnetic tape.

Since the seismic signals recorded on magnetic tape are not in a visible form, it is necessary that they be monitored to insure that useful signals are being recorded and the equipment is operating properly. It can be appreciated that the expense of recording the geophone signals is small when compared to the expense of travelling to the area to be surveyed and placing the geophones in position. Thus, it is customary to observe the geophone signals on a monitoring device. The most commonly employed device consists of a monitoring camera wherein the geophone signals are recorded on a photosensitive film of paper that is then developed. Recording is usually done by means of moving mirror galvanometers that reflect a high-intensity light beam onto the moving film strip and deflect the light beam in response to the geophone signal. While this provides a useful record for monitoring the results in the field, it is appreciated that it is a rather expensive operation due to the cost of the materials involved and the quantity of materials used.

After the records are obtained they are generally processed at a central location. The process includes corrections for the horizontal distance between the geophones and the original explosion and for the difference in velocity of the seismic wave with depth of the reflector. Also, the records are filtered and other process techniques used to improve their signal-to-noise ratio. It is also helpful to monitor the data between stages of processing and after processing as a check on the equipment functioning properly. Finally, the processed records are converted to a visual form for study and interpretation by a skilled geologist or geophysicist.

Summary of the invention

The present invention solves the problem of expense of providing both monitor records for monitoring the field recording of the geophone signals as well as monitoring records for the central processing of the field-recorded seismic data by employing an inexpensive photoconductive paper in place of normally used silver-halide paper or film. The process of this invention utilizes a photoconductive paper which is electrostatically charged. The charged paper is than exposed to a light beam, as for example, the beam of a moving mirror galvanometer that is responsive to the signal to be recorded. As is well known, the paper will be discharged in the area where the light beam strikes it and retain its electrostatic charge in the remaining area. After the signal is written on the paper, the paper is passed through a liquid developer bath that includes pigmented particles capable of becoming chemically bonded to paper on which they are absorbed. The particles are charged with the same polarity as the electrostatic charge of the paper and will adhere to the discharged areas and be repelled from the charged areas of the paper. After passing through the developer bath the paper passes through a pair of squeeze rollers where the excess liquid is removed and pigmented particles are left on the paper. The paper then passes between a drive roller and a pressure roller and is discharged from the monitoring camera. The drive roller in addition to furnishing the power to pull the paper through the monitoring camera is also driven at a constant speed in order that the length of the record may be related to real time.

Brief description of the drawing

The above advantages of this invention will be more apparent from the following detailed description of a preferred embodiment when taken in conjunction with the attached drawing showing a schematic embodiment of the process.

Description of preferred embodiment

Referring now to the attached drawing there is shown a conventional film camera modified to use photoconductive paper in accordance with this invention. The bottom housing 10 of the camera encloses the complete processing equipment for the photoconductive paper. The housing 10 should be light tight in order that the photoconductive paper will not be subject to excess light after is is electrostatically charged. Mounted within the housing 10 is a supporting frame 11 for supporting the roll 13 of the photoconductive paper. The roll 13 of the photoconductive paper is mounted on a shaft 12 that is journaled in suitable bearings in the frame 11. The photoconductive paper may be of any of the commercially available papers, for example, the zinc oxide coated paper used in commercial document copiers.

The paper from the roll passes up over the corona charger roller 14. Positioned adjacent the roller 14 is the corona charger that consists of a tubular member 15 having a thin metal ribbon 16 disposed along its longitudinal axis. The corona charger is provided with a window 21 through which the ions may pass to electrostatically charge the paper. The center electrode 16 is connected to a high voltage power supply 20, preferably 10 kv. or higher. When the high voltage is applied to electrode 16, it will ionize the atmosphere in the tubular member 15 and thus cause an avalanche of ions to impinge upon the photoconductive paper.

After the paper is electrostatically charged it passes over the image roller 22 where the geophone signals or processed signals are recorded or written on the paper. As shown in the drawing, the signals are recorded by means of a moving mirror galvanometer 23. The galvanometer is provided with a mirror 24 that is deflected in response to the signal to be recorded. As the mirror is deflected it moves a focused light beam 26 along an axis normal to the movement of the paper. The light beam is focused by a converging lens 25 which reduces the beam to a single point source 27 at the surface of the paper. A window 30 is provided in housing 10 to permit the light beam to impinge upon the paper. The galvanometer and associated equipment is enclosed within a light-tight housing 50 to limit the stray light that impinges upon the paper.

As is known in the xerographic arts, the electrostatically charged paper will be discharged in the area where the light strikes it. Due to the photoconductivity of the coating, the paper will conduct and the charge will be dissipated through the grounded image roller 22. The remaining areas of the coated paper will retain their negative electrostatic charge.

Prior to recording the seismic signals on the paper, timing lines may be recorded thereon. The timing lines may be recorded by periodically flashing a high-intensity light to form a series of timing lines. While a flashing light may be used it is subject to burn out and requires careful optical alignment when it is replaced. The present invention uses an electrode 51 that is alternately connected to a source of high voltage potential and to ground. The electrode is coupled to a switching circuit 52 that alternately couples the electrode to the high voltage supply and to ground. The voltage applied to the electrode should equal the voltage potential on the charged paper. This voltage will normally be lower than the voltage of the high voltage supply and a resistor or potentiometer must be placed in the connection between the electrodes and voltage supply. A ground plate 53 is placed below the electrode and the charged paper passes between the electrode and the ground plate.

When the electrode is coupled to ground it will discharge the paper and when it is coupled to a high voltage the paper will remain charged. Thus, there will appear on the paper a series of lines whose separation correspond to the frequency of the switching circuit. If the switching circuit is synchronized with time the lines will represent true timing lines on the developed paper.

After the seismic signals are recorded, the paper travels downwardly through a developer tank 32 where the paper contacts a liquid developer 34. The liquid developer is preferably a suspension of particles that are negatively charged in a low-boiling point liquid having a relatively high resistivity. A suitable liquid would be freon 113 that boils at approximately 117° F. while the particles may be graphite. The paper passes over an idler roller 33 at the bottom of the tank and then upwardly through a pair of squeeze rollers 35 and 36. The squeeze rollers 35 and 36 remove the excess liquid from the paper. The paper being negatively charged will repel the negatively charged particles and pigmented particles will only attach to the discharged areas. Thus, one will obtain a black recording on a white background. Of course, the orders of colors could be reversed by using positively charged particles that would be repelled by the discharged areas and attracted to the charged areas.

After passing through the squeeze rollers the paper passes over an idler roller 40 and then downwardly between a drive roller 41 and a pressure roller 42. The drive roller is driven at a constant speed by means of an electric motor 43 to insure that the paper is advanced at a constant speed through the monitoring camera. Thus, the lengthwise dimension of the paper can be directly related to real time and converted to depth by known means.

From the above description it can be seen that the process of this invention provides an economical means by which the recording of seismic signals in the field can be monitored. Moreover, the system requires only minor modifications in existing monitoring camera equipment that is designed to use silver-halide coated film or paper. For example, the presently used recording galvanometers and film advancing equipment may be retained. The system only requires the addition of the corona charging equipment and a tank for facilitating development.

We claim as our invention:
1. A process for continuously monitoring a seismic signal comprising:
   transporting a continuous strip of paper coated with a photoconductive material past a source of ions to place an eltctrostatic charge on the photoconductive material;
   positioning an electrode adjacent the continuous strip of paper and at a fixed frequency alternately coupling said electrode to a source of voltage and to ground to provide a time-synchronized series of alterations of the electrostatic charge;
   moving the strip at a constant speed while focusing a movable light beam on said paper deflecting said light beam in response to fluctuations in the seismic signal to discharge selected areas of the paper, said deflections being normal to the movement of the paper;
   passing the exposed paper through a liquid bath containing charged pigmented particles that adhere to the discharged areas of the paper;
   passing the paper from the liquid bath through a pair of squeeze rollers to remove the excess liquid; and
   passing the paper between a drive roller and a pressure roller that are driven at a constant speed.
2. The process of claim 1 wherein both the paper and pigmented particles are negatively charged.

References Cited
UNITED STATES PATENTS

| | | | |
|---|---|---|---|
| 3,392,401 | 7/1968 | Lloyd | 346—23 |
| 2,458,877 | 1/1949 | Rose | 346—107 X |
| 2,986,442 | 5/1961 | Broding | 346—74 |
| 3,091,762 | 5/1963 | Schwertz | 346—74 X |
| 3,241,957 | 3/1966 | Fauser et al. | 96—1 |
| 2,276,896 | 10/1966 | Fisher | 117—37 |

RICHARD B. WILKINSON, *Primary Examiner.*

J. W. HARTARY, *Assistant Examiner.*

346—23, 74.